Feb. 23, 1954     P. D. MANGANO     2,670,102

INANIMATE COW MILK DISPENSER

Filed Jan. 30, 1953

INVENTOR.
PHILIP D. MANGANO
BY
*William Frederick Werner*
ATTORNEY

Patented Feb. 23, 1954

2,670,102

UNITED STATES PATENT OFFICE 2,670,102

INANIMATE COW MILK DISPENSER

Philip D. Mangano, Providence, R. I.

Application January 30, 1953, Serial No. 334,184

1 Claim. (Cl. 222—78)

This invention relates to a milk dispenser in the form of a cow and more particularly to a milk dispenser for household table use which will simulate a cow giving milk.

One of the objects of the present invention is to provide a milk dispenser for household use which will intrigue, delight and induce children to drink milk.

Another object of the present invention is to provide an attractive and useful milk container for household, nursery or restaurant use.

Still another object of the present invention is to provide an inexpensive, long lasting, mechanically fool proof and novel liquid dispenser.

Other objects of the present invention will be pointed out in part and become apparent in part in the following specification and claim.

In the past mechanical milk dispensers have lacked the ability to lend themselves to the sterile cleanliness so necessary to the storage and use of milk because the mechanical parts were in the nature of machinery. In addition the mechanical parts required manufacturing procedures which were too costly, in a competitive economy, to warrant the mass purchases so necessary to mass production manufacturing methods. The present invention contemplates a simple, inexpensive molded casing, housing a dispensing mechanism easily cleaned and free from mechanical disarrangement.

Referring to the drawings in which similar characters of reference indicate corresponding parts in all the figures.

Figure 1:
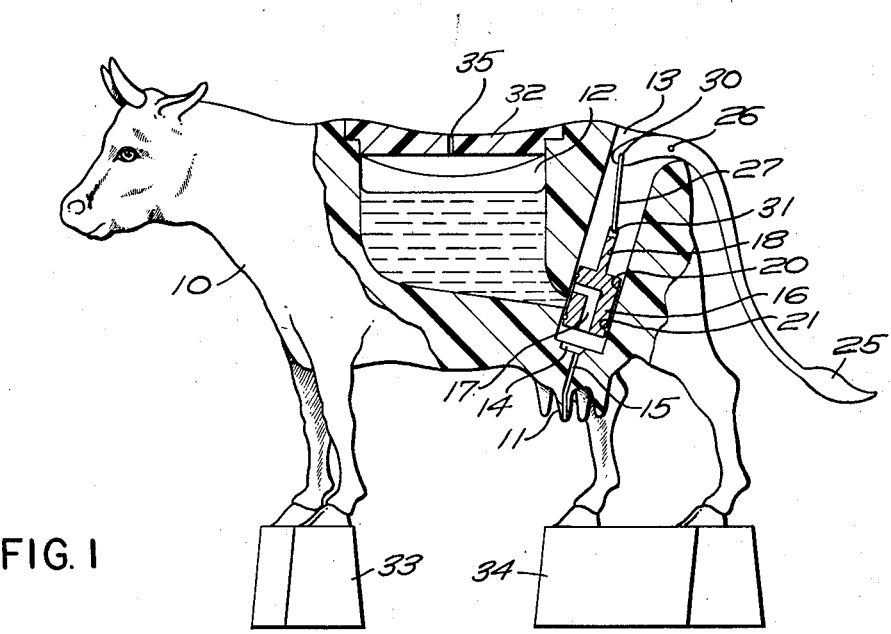
Figure 1 is a side elevational view of the new and improved inanimate cow milk dispenser with a portion broken away to illustrate the working mechanism.

Referring to Figure 1 wherein plastic material is molded to simulate a cow body 10 having one perforated teat 11 and a hollow casing 12 arranged to communicate with a bore 13 having a well 14 connected to a conduit 15 passing through and forming part of said perforated teat 11.

A plunger 16 provided with an L shaped passageway 17, a stem 18 and grooves 20, 21 is slidably mounted in bore 13. Packing which may take the form of neoprene O rings 23, 24 is provided in grooves 20, 21 respectively, provides a fluid tight seal for plunger 16. The cow's tail 25 is in effect a plunger handle pivotally mounted in cow body 10 at 26 and is pivotally connected to stem 18 by means of link 27 at positions 30 and 31. A cover 32 blending into the contour of cow body 10 is removably positioned over hollow casing 12. Blocks 33, 34 may be provided as a base for cow body 10 to permit a cup, glass or other receptacle to be positioned under teat 11.

Figures 2, 3:
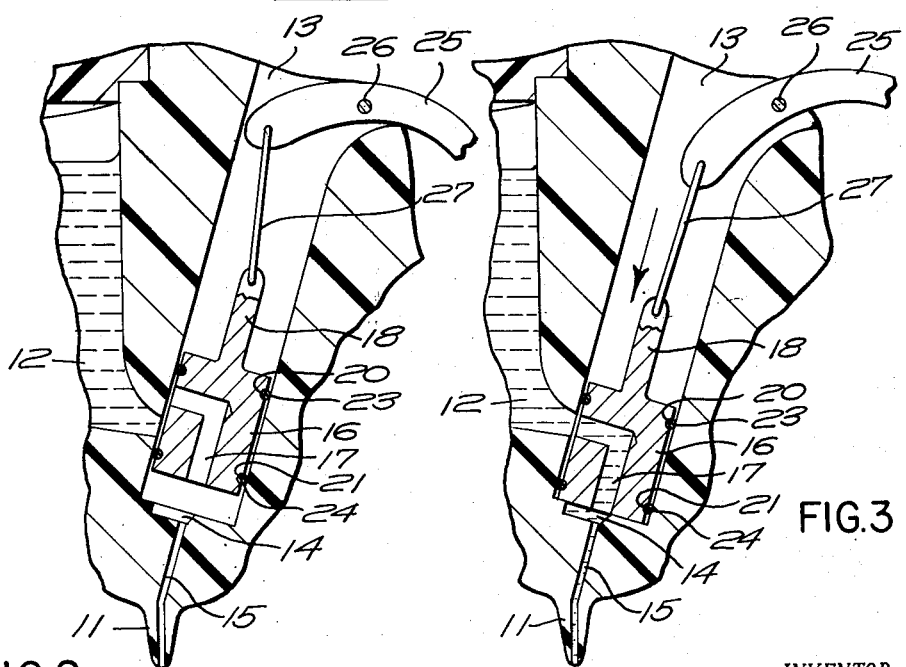
Figure 2 is a fragmentary sectional view showing the mechanical arrangement in non-dispensing position.
Figure 3 is similar to Figure 2 but showing the mechanical position of the mechanism when in liquid dispensing position.

In operation cover 32 will be removed, tail 25 will be positioned as shown in Figures 1 and 2 and milk or other liquid will be poured into hollow casing 12. Cover 32 will be replaced as shown in Figure 1. A glass may be placed under perforated teat 11. Tail 25 will be raised allowing L-shaped passageway 17 to communicate with hollow casing 12 and well 14, thereby permitting the milk to freely pass into conduit 15 and into the glass (not shown). When sufficient milk is permitted to flow, tail 25 is depressed causing the side of plunger 16 to block out hollow casing 12. Packings 23 and 24 prevent leakage and dripping. The angle of passageway 17 prevents milk from accumulating therein. A vent 35 is provided in cover 32.

Having shown and described a preferred embodiment of the present invention, by way of example, it should be realized that structural changes could be made and other examples given without departing from the spirit or scope of this invention.

What I claim is:

An inanimate cow milk dispenser comprising material formed to simulate a cow and having one perforated teat, a hollow casing and a bore having a well within said cow figure, communication between said casing and said bore, a conduit connecting said well with said perforated teat and forming part thereof, a plunger provided with an L-shaped passageway and having a stem and grooves, fluid tight packing provided in said grooves, said plunger being slidably mounted in said bore with said L-shaped passageway engaging and disengaging said communication between said hollow casing and said bore, a cow's tail plunger handle pivotally mounted in said cow's body, a link pivotally mounted to said plunger handle and said stem and a cover provided with a vent removably positioned over said hollow casing and forming part of the contour of the cow figure.

PHILIP D. MANGANO.

References Cited in the file of this patent

UNITED STATES PATENTS

| Number | Name | Date |
|---|---|---|
| 2,106,562 | Bucci | Jan. 25, 1938 |
| 2,111,123 | Morlok | Mar. 15, 1938 |
| 2,619,257 | Posner | Nov. 25, 1952 |
| 2,643,033 | Miscione | June 23, 1953 |